United States Patent Office 3,475,379
Patented Oct. 28, 1969

3,475,379
PRODUCTION OF LINEAR POLYESTERS USING TRIETHANOLAMINE AS CATALYST
Paul Hilaire, Lyon, Rhone, France, assignor to Societe Rhodiaceta, Paris, France, a French body corporate
No Drawing. Filed Nov. 10, 1966, Ser. No. 593,288
Claims priority, application France, Nov. 18, 1965, 38,923
Int. Cl. C08g 17/013
U.S. Cl. 260—75                                                6 Claims

ABSTRACT OF THE DISCLOSURE

In the production of fibre-forming high linear polyesters, especially polyethylene terephthalates, by polycondensation of the corresponding bis-($\omega$-hydroxyalkyl) terephthalates, triethanolamine is used as catalyst for the polycondensation in amount 10–500, preferably 50–250, parts by weight per million parts of the bis-hydroxyalkyl terephthalate reckoned as dimethyl terephthalate. When the bis-hydroxyalkyl terephthalate is made by ester interchange between a lower dialkyl terephthalate and a glycol, it is preferred to use for the ester interchange a known catalyst for that reaction, and to add the triethanolamine at about the beginning of the polycondensation.

---

This invention relates to the production of linear polyesters, especially linear polyesters derived from terephthalic esters.

Synthetic linear polyesters derived from glycols and dicarboxylic acids, which can be drawn into fibers, are well known. Polyesters derived from terephthlic acid and a glycol of the formula $HO(CH_2)_nOH$, in which $n$ is an integer between 2 and 10, and more particularly polyethylene terephthalate, have proved particularly interesting.

Polyethylene terephthalate is obtained by polycondensation, under reduced pressure and at relatively high temperature, of bis-($\beta$-hydroxyethyl)terephthalate (or an oligomer thereof, e.g. a dimer, trimer or tetramer obtained as the result of a limited degree of polycondensation). This monomer is generally itself obtained by ester-interchange between ethylene glycol and dimethyl terephthalate, though it may also be obtained by reacting terephtalic acid with ethylene glycol or ethylene oxide. All such reactions require the presence of a catalyst if they are to take place in a reasonably short time.

As catalysts, it has been proposed to employ metals or organic or inorganic derivatives thereof, both for the ester-interchange or ester formation and for the polycondensation. However, for catalysing the polycondensation, antimony oxide is usually employed, though it has the disadvantage that it is used as a powder which is rather sparingly soluble in the reaction mixture and must be employed in relatively large quantities.

According to the present invention, poly-(polymethylene terephthalates) are made by polycondensation of bis-($\omega$-hydroxy-n-alkyl) terephthalate and their oligomers in the presence of triethanolamine as catalyst.

We have previously proposed to employ a complex of triethanolamine with bismuth to accelerate the polycondensation, but the polymers obtained are slightly coloured. In addition, it is known to use as ester-interchange catalysts tertiary amines such as trimethylamine, N-ethylmorpholine or N-cyclohexyldiethylamine, but these amines must be eliminated by evaporation before the polycondensation if a substantially colourless polymer is to be obtained. It was therefore entirely unexpected that triethanolamine itself is both an effective polycondensation catalyst and leads to colourless polymers.

The melting point of triethanolamine is about 20–21° C. and it is preferably incorporated in the reaction mixture in liquid form. It is then perfectly miscible with the reaction mixture, and the quantity needed to exert a sufficient catalytic effect is very small, of the order of 10 to 500 parts by weight per million parts by weight calculated on the starting material (reckoned as dimethyl terephthalate); 50 to 250 parts per million are preferably used.

If the starting material is obtained by ester-interchange between a diester of terephthalic acid and a glycol, the triethanolamine is added to the reactants when the ester-interchange reaction has ended. Generally, a conventional ester-interchange catalyst such as calcium acetate, manganous acetate or zinc acetate is employed. The polycondensation is carried out at the usual polycondensation temperatures, preferably between 270° and 290° C.

The following examples illustrate the invention.

EXAMPLE 1–6

In Examples 1 to 6, which are summarised in Table I, the polycondensation is carried out as follows:

The ester-interchange between 3,298 g. (17 mol) of dimethyl terephthalate and 2,635 g. (42.5 mol) of ethylene glycol is first carried out in a 10 litre round-bottomed glass flask, in the presence of an ester-interchange catalyst. After the methanol produced and excess ethylene glycol have been distilled off, the reaction mass is transferred into a 7.5 litre stainless-steel autoclave provided with a stirring system. There is then added to the reactants, which are at a temperature of about 230° C., either triethanolamine in liquid form or (for comparison) antimony oxide in suspension in ethylene glycol and 0.5% by weight, calculated on the polymer to be produced, of titanium dioxide also in suspension in ethylene glycol. The reaction mass is then heated to 250° C. with stirring at atmospheric pressure, while ethylene glycol is distilled off. The product is thereafter further heated from 250° C. to the temperature T chosen for the polycondensation, while the pressure in the autoclave is gradually lowered to about 2.5 mm. Hg. Finally, in a last phase, referred to in Table I as the polycondensation phase, the pressure is further lowered to 0.2 mm. Hg, while the reaction mass is maintained at the temperature T. As may be seen from Table I, the duration of this latter phase varies with the nature and the quantity of the catalyst. Comparison of Examples 1 and 3 with Examples 2 and 4 shows the advantage afforded by triethanolamine over antimony oxide; even though much less is used, the polycondensation phase goes more rapidly. In both cases, the number of terminal carboxyl groups and the softening point are very similar showing that the triethanolamine does not cause degradation of the polymer in spite of its high catalytic activity.

TABLE I

| Example No. | Ester Interchange catalyst | | Polycondensation catalyst | | Polycondensation phase | | Characteristics of the polymer | | |
|---|---|---|---|---|---|---|---|---|---|
| | Nature | Amount [1] | Nature | Amount [1] | T., °C. | Duration | I.V. [2] | G.T. COOH [3] | P.R., °C. [4] |
| 1 | Manganous acetate | 108 | Triethanolamine | 50 | 285 | 1 h. 20 min | 0.66 | 32 | 261 |
| 2 | do | 108 | $Sb_2O_3$ | 340 | 285 | 1 h. 40 min | 0.66 | 30 | 261 |
| 3 | Calcium acetate | 180 | Triethanolamine | 10 | 285 | 1 h. 30 min | 0.66 | 25 | 262 |
| 4 | do | 180 | $Sb_2O_3$ | 340 | 285 | 1 h. 45 min | 0.66 | 28 | 262 |
| 5 | Zinc acetate | 54 | Triethanolamine | 10 | 275 | 1 h. 33 min | 0.66 | 33 | 261.5 |
| 6 | do | 54 | $Sb_2O_3$ | 170 | 275 | 1 h. 22 min | 0.66 | 33 | 261.5 |

[1] Parts per million by weight of metal (Mn, Sb, Ca, Zn) or of trimethanolamine calculated on the dimethyl terephthalate.
[2] I.V.=intrinsic viscosity determined at 25° C. on a 1% by weight per volume solution of polymer in o-chlorophenol.
[3] G.T. COOH=number of terminal groups COOH per ton of polymer.
[4] P.R.=Softening point measured by penetrometry (the principle of determination is described by O.B. Edgar & E. Ellery J. Chem. Soc. 2,633–2,638 (1952)).

In Examples 7 to 10, which are summarised in Table II, the polycondensation was carried out by the same procedure as in Examples 1 to 6, but in a 50 litre autoclave, in the presence of 0.5% by weight, calculated on the polymer, of titanium dioxide in suspension in glycol and phosphorous acid, at 285° C.

It will be seen from Table II that the duration of the polycondensation and the characteristics of the polymer vary only slightly as a function of the quantity of triethanolamine introduced. In addition, the presence of phosphorous acid has no appreciable effect on the characteristics (intrinsic viscosity, terminal carboxyl groups, softening point) of the polymer, although the duration of the polycondensation phase is slightly increased.

TABLE II

| Example No. | Ester-Interchange catalyst | | Polycondensation catalyst | | $H_3PO_3$ Content [5] | Duration of the polycondensation | Characteristics of the polymer | | |
|---|---|---|---|---|---|---|---|---|---|
| | Nature | Amount [1] | Nature | Amount [1] | | | I.V. [2] | G.T. COOH [3] | P.R., °C. [4] |
| 7 | Calcium acetate | 180 | Triethanolamine | 50 | 0.024 | 2 h. 30 min | 0.68 | 26 | 259.5 |
| 8 | do | 180 | do | 100 | 0.042 | 2 h. 25 min | 0.68 | 25 | 260 |
| 9 | do | 180 | do | 250 | 0.024 | 2 h. 07 min | 0.68 | 22 | 262.5 |
| 10 | do | 180 | do | 500 | 0.024 | 2 h. 20 min | 0.68 | 23 | 261 |

[1][2][3][4] See footnotes in Table I.
[5] Percentage by weight calculated on the dimethyl terephthalate.

The polymers obtained by the process of the invention are very white and possess in particular very high thermal stability, as high as that of the polymers obtained with antimony oxide.

Comparative tests by thermal treatment at 185° C. in air for 10 hours were carried out on polymers obtained with antimony oxide and polymers obtained by the process of the invention as shown in Examples 7 to 10 in Table II, and the results obtained are set out in Table III.

TABLE III

| Ester-Interchange Catalyst | | Polycondensation catalyst | | Before thermal treatment | | After thermal treatment | | Variation of the characteristics of the polymer | |
|---|---|---|---|---|---|---|---|---|---|
| Nature | Amount [1] | Nature | Amount [1] | I.V. [2] | G.T. COOH [3] | I.V. [2] | G.T. COOH [3] | Δ I.V. | Δ G.T. COOH |
| Calcium acetate | 180 | Triethanolamine | 50 | 0.68 | 26 | 0.68 | 29 | 0 | 3 |
| Do | 180 | do | 100 | 0.68 | 25 | 0.67 | 29 | 0.01 | 4 |
| Do | 180 | do | 250 | 0.68 | 22 | 0.65 | 28 | 0.03 | 6 |
| Do | 180 | do | 500 | 0.68 | 23 | 0.68 | 24 | 0 | 1 |
| Do | 180 | $Sb_2O_3$ | 340 | 0.67 | 25 | 0.65 | 29 | 0.02 | 4 |

[1][2][3] See footnotes in Table I and II.

Nitrogen determinations were also made on the polymers with a precision of 10%, and these proved that all the triethanolamine introduced is to be found in the polymer. Despite this, the polymers are colourless, as already mentioned. Table IV summarises these results.

TABLE IV

| Triethanolamine introduced | Triethanolamine found by analysis |
|---|---|
| Amount [1] | Amount [1] |
| 100 | 110 |
| 250 | 230 |
| 500 | 480 |

[1] See footnote at end of Tables I, II, and III.

Finally, spinning and stretching tests have shown that yarns having normal characteristics are obtained from the polymers obtained by the process of the invention.

Thus, for example, a yarn having a count of 45 denier, 22 filaments, spun at 285° C. at a speed of 900 m./min. and stretched by 3.6 times, had a tenacity of 4.60 g.p.d. and an elongation of 24%.

I claim:

1. Process for the production of high linear fibre forming poly-(polymethylene)terephthalates by polycondensing bis-(ω-hydroxyalkyl)-terephthalates and their oligomers, which comprises the improvement of carrying out the polycondensation in the presence of triethanolamine as a catalyst therefor in amount 10–500 parts by weight of triethanolamine per million parts of starting material reckoned as dimethyl terephthalate.

2. Process according to claim 1, wherein 50–250 parts per million of triethanolamine are used.

3. Process according to claim 1, wherein the bis-terephthalate used as starting material is made by an ester-interchange reaction, and the triethanolamine is added to the reaction mixture between the ester-interchange and the polycondensation.

4. Process according to claim 1, wherein the triethanolamine is added to the reaction composition as a liquid.

5. Process according to claim 1, wherein the polycondensation is effected at a temperature of 270°–290° C.

6. Process for the production of high linear fibre forming poly-(polymethylene)-terephthalates, which comprises making a bis-(ω-hydroxyalkyl)terephthalate by an ester-interchange reaction, adding thereto as a polycondensation catalyst 10–500 parts by weight of liquid triethanolamine per million parts of the terephthalate reckoned as dimethyl terephthalate, and heating the mixture until a linear polyester has been formed by polycondensation.

References Cited

UNITED STATES PATENTS 2,363,581  11/1944  Frosch.
2,437,232   3/1948  Rothrock et al.

WILLIAM H. SHORT, Primary Examiner

LOUISE P. QUAST, Assistant Examiner

U.S. Cl. X.R.

260—475